(12) United States Patent
Zhou (10) Patent No.: US 12,266,071 B2
(45) Date of Patent: Apr. 1, 2025

(54) USER-INTERFACE-FRAMEWORK BASED PROCESSING METHOD, APPARATUS, DEVICE, AND MEDIUM

(71) Applicant: BEIJING ZITIAO NETWORK TECHNOLOGY CO., LTD., Beijing (CN)

(72) Inventor: Tianzhu Zhou, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 18/056,497

(22) Filed: Nov. 17, 2022

(65) Prior Publication Data

US 2023/0290095 A1    Sep. 14, 2023

(30) Foreign Application Priority Data

Mar. 10, 2022    (CN) .......................... 202210229810.9

(51) Int. Cl.
*G06T 19/20*    (2011.01)
*G06F 3/0481*    (2022.01)
*G06F 3/04815*    (2022.01)
*G06F 8/38*    (2018.01)
*G06F 16/56*    (2019.01)
*G06T 15/02*    (2011.01)

(52) U.S. Cl.
CPC .......... *G06T 19/20* (2013.01); *G06F 3/04815* (2013.01); *G06F 16/56* (2019.01); *G06T 15/02* (2013.01); *G06F 3/0481* (2013.01); *G06F 8/38* (2013.01); *G06T 2200/24* (2013.01); *G06T 2210/61* (2013.01); *G06T 2219/2024* (2013.01)

(58) Field of Classification Search
CPC . G06T 11/60; G06T 7/13; G06T 2207/20084; G06V 10/44; G06N 3/08; G06N 20/00; G06N 3/02
See application file for complete search history.

(56) References Cited

U.S. PATENT DOCUMENTS

| | | | |
|---|---|---|---|
| 2009/0172349 A1* | 7/2009 | Sprangle | G06F 9/30025 712/E9.021 |
| 2009/0235156 A1* | 9/2009 | Wake | G06F 40/166 715/781 |
| 2015/0154783 A1* | 6/2015 | Grundhofer | G06T 19/006 348/745 |
| 2016/0349979 A1* | 12/2016 | Sharp | G06F 3/0412 |
| 2017/0147537 A1* | 5/2017 | Coker | G06F 40/117 |

(Continued)

FOREIGN PATENT DOCUMENTS

| | | |
|---|---|---|
| CN | 105138230 A | 12/2015 |
| CN | 105917307 A | 8/2016 |

(Continued)

*Primary Examiner* — YuJang Tswei (57) ABSTRACT

The present disclosure relates to a user-interface-framework based processing method, apparatus, device, and medium. The method includes: acquiring a data set of a target component based on a user-interface-framework; performing a layout process on the data set to obtain display style information of the target component; converting the display style information into a drawing vector based on a preset vector drawing library; and generating and displaying a rendering result of the target component based on the drawing vector.

18 Claims, 4 Drawing Sheets

(56) References Cited

U.S. PATENT DOCUMENTS

| | | | | |
|---|---|---|---|---|
| 2017/0178393 A1* | 6/2017 | Nakajo | | G06T 13/20 |
| 2018/0357519 A1* | 12/2018 | Jin | | G06V 10/764 |
| 2020/0379642 A1* | 12/2020 | Kubo | | H04L 12/1827 |
| 2021/0272654 A1* | 9/2021 | Thaker | | G01N 15/1433 |
| 2021/0382936 A1* | 12/2021 | Tomar | | G06N 20/00 |
| 2022/0294992 A1* | 9/2022 | Manzari | | H04N 23/633 |

FOREIGN PATENT DOCUMENTS

| | | |
|---|---|---|
| CN | 110069257 A | 7/2019 |
| CN | 111740948 A | 10/2020 |
| CN | 112114807 A | 12/2020 |
| CN | 113835704 A | 12/2021 |
| WO | 2015088989 A1 | 6/2015 |

* cited by examiner

USER-INTERFACE-FRAMEWORK BASED PROCESSING METHOD, APPARATUS, DEVICE, AND MEDIUM

CROSS-REFERENCE TO RELATED APPLICATIONS

The present disclosure is based on and claims priority to China Patent Application No. 202210229810.9 filed on Mar. 10, 2022 and entitled as "user-interface-framework based processing method, apparatus, device, and medium", the disclosure of which is incorporated by reference herein in its entirety.

TECHNICAL FIELD

This disclosure relates to the technical field of graphical user interface, and particularly, to a user-interface-framework based processing method, apparatus, device, and medium.

BACKGROUND

Generally, a UI (User Interface) framework is a set of computer user interface programming libraries, which allow a programmer to draw a specific graphical user interface by providing a series of data structures and methods, such as a three-dimensional editor.

SUMMARY

The present disclosure provides a user-interface-framework based processing method, apparatus, device, and medium.

An embodiment of the present disclosure provides a user-interface-framework based processing method, comprising:
 acquiring a data set of a target component based on a user-interface-framework;
 performing a layout process on the data set to obtain display style information of the target component;
 converting the display style information into a drawing vector based on a preset vector drawing library; and
 generating and displaying a rendering result of the target component based on the drawing vector.

An embodiment of the present disclosure further provides a user-interface-framework based processing apparatus, comprising:
 a data acquiring module configured to acquire a data set of a target component based on a user-interface-framework;
 a layout generating module configured to perform a layout process on the data set to obtain display style information of the target component;
 a description converting module configured to convert the display style information into a drawing vector based on a preset vector drawing library; and
 a generating and displaying module configured to generate and display a rendering result of the target component based on the drawing vector.

An embodiment of the present disclosure further provides an electronic device, comprising: a processor; and a memory for storing instructions executable by the processor; the processor being configured to read the executable instructions from the memory and execute the instructions to implement the user-interface-framework based processing method according to the embodiment of the present disclosure.

An embodiment of the present disclosure further provides a non-transitory computer-readable storage medium having stored thereon a computer program for performing the user-interface-framework based processing method according to the embodiment of the present disclosure.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, identical or similar reference numbers refer to identical or similar elements. It should be understood that the drawings are schematic and components and elements are not necessarily drawn to scale.

DETAILED DESCRIPTION

Embodiments of the present disclosure will be described in more detail below with reference to the accompanying drawings. While certain embodiments of the present disclosure are shown in the drawings, it should be understood that the present disclosure can be implemented in various forms and should not be construed as being limited to the embodiments set forth herein, and on the contrary, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method implementations of the present disclosure can be performed in a different order, and/or performed in parallel. Furthermore, the method implementations can include additional steps and/or omit performing illustrated steps. The scope of the present disclosure is not limited in this respect.

The term "comprising" and variations thereof used herein are open-minded, i.e., "comprising but not limited to". The term "based on" is "based at least in part on". The term "one embodiment" means "at least one embodiment"; the term "another embodiment" means "at least one other embodiment"; and the term "some embodiments" means "at least some embodiments". Related definitions for other terms will be given in the following description.

It should be noted that concepts "first", "second", and the like mentioned in the present disclosure are only used for distinguishing different devices, modules or units, and are not used for limiting the order or interdependence of functions performed by the devices, modules, or units.

It should be noted that modifications of "one" or "a plurality of" mentioned in the present disclosure are intended to be illustrative rather than limiting, and that those skilled in the art should appreciate that they should be understood as "one or more" unless clearly indicated in the context otherwise.

Names of messages or information exchanged between a plurality of devices in the implementations of the present disclosure are for illustrative purposes only, and are not intended to limit the scope of the messages or information.

In a UI-framework provided by a platform in the related art, for UI component style processing, reparsing and recompiling are required, and rendering results are displayed unstably, thereby resulting in a low efficiency and a high cost of the UI component processing.

The technical solutions provided by the embodiments of the present disclosure have the following advantages over the related art: the user-interface-framework based processing solutions provided by the embodiments of the present disclosure acquire a data set of a target component based on a user-interface-framework; perform a layout process on the data set to obtain display style information of the target component; convert the display style information into a drawing vector based on a preset vector drawing library; and generate and displaying a rendering result of the target component based on the drawing vector. By adopting the above technical solutions, in the user-interface-framework based process, the layout process on the data set can improve the processing efficiency as to the component, and a vector describing processing based on the vector drawing library can naturally cross platforms for the realization of the user interface representation and can satisfy more visual effects, and finally, generating the rendering result of the target component based on the drawing vector description ensures the stability of the rendering result and further improves the component presentation effect in the user-interface-framework scene.

Figure 1:
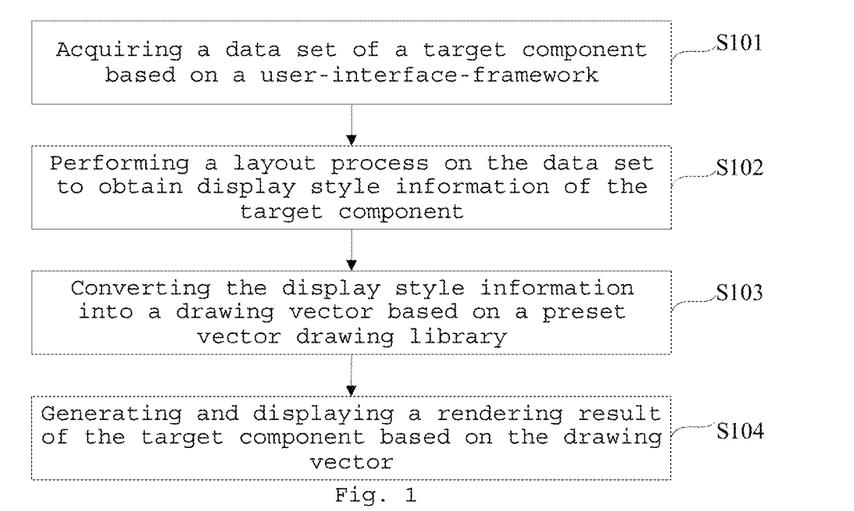
FIG. 1 is a schematic flow diagram of a user-interface-framework based processing method according to an embodiment of the present disclosure.

FIG. 1 is a schematic flow diagram of a user-interface-framework based processing method according to an embodiment of the present disclosure. The method can be performed by a user-interface-framework based processing apparatus, wherein the apparatus can be implemented by software and/or hardware, and can be generally integrated in an electronic device. As shown in FIG. 1, the method comprises:

step 101, acquiring a data set of a target component based on a user-interface-framework.

The target component can be any component such as a button, a menu, a pop-up window, and the like, and a form of the target component is not limited in the embodiment of the present disclosure. For example, the target component can be a block button, and can also be an ordinary button. The data set refers to a plurality of sets of data related to the target component, and in the embodiment of the present disclosure, refers to a data set for representing layout content, a visual description, a current hierarchy, current logic, and the like, which are related to the target component. For example, the data set is layout content, including a numerical value of width, a numerical value of height, and the like.

In some implementations, the acquiring a data set of a target component based on a user-interface-framework comprises: acquiring the data set of the target component, based on a set of data of length and width inputted by a user on an operation interface and a set of data of position, color and offset inputted by the user on the operation interface. The operation interface refers to a page provided to the user for operation, and the operation interface can include a data set input option for the component. The user-interface-framework can, based on input as to business development, convert it into a product, such as a three-dimensional editor, so that the editing processing efficiency and the visual effect can be improved.

In other implementations, the acquiring a data set of a target component based on a user-interface-framework comprises: calling the data set corresponding to the target component acquired by a target engine from a third-party database. That is to say, in a case wherein the data set of the target component inputted by the user is not received, a pre-stored data set can be called for subsequent layout process. The above two implementations are only examples, and the manner of acquiring the data set of the target component based on a user-interface-framework is not specifically limited in the embodiment of the present disclosure.

It should be noted that, the target component is treated as a combination of a set of data. By combining these data sets in various ways, more new components can be obtained.

Specifically, an input operation of the user on the operation interface of the user-interface-framework is detected, and when an operation such as click and selection of the user on the data set input option for the component is detected and related data is inputted, the data set of the target component can be acquired.

Step 102, performing a layout process on the data set to obtain display style information of the target component.

The display style information refers to a set of data for describing display logic of the target component, and can also be understood as position and size of a shape bounding box of the target component, which decide a position of the target component in a display screen. In the embodiment of the present disclosure, the performing a layout process on the data set to generate display style information of the target component comprises: processing the data set to map it into a style library function, to obtain the display style information of the target component. Layout can be understood as position and size information of the displayed component.

In the embodiment of the present disclosure, after the data set of the target component being acquired based on the user-interface-framework, a data-style mapping process can be performed on the data set to obtain the display style information of the target component.

Step 103, converting the display style information into a drawing vector based on a preset vector drawing library.

The vector drawing library refers to a database for converting a set of data to obtain the drawing vector. Vector refers to a graph formed by connecting a series of points, and the drawing vector refers to what form of drawing is performed on what path and in what style.

In the embodiment of the present disclosure, after the display style information is acquired, conversion is performed in the vector drawing library based on the display style information, to acquire a drawing style, a drawing path, and a drawing form, and the drawing vector is generated based on the drawing style, the drawing path, and the drawing form.

Step 104, generating and displaying a rendering result of the target component based on the drawing vector.

Specifically, a rendering underlying context can be shared between a rendering engine and the user-interface-framework, and after the drawing vector is acquired, a process is performed based on an underlying application program interface to obtain and display the rendering result.

The user-interface-framework based processing solutions according to the embodiment of the present disclosure acquire the data set of the target component based on the user-interface-framework, perform the layout process on the data set to obtain the display style information of the target component, convert the display style information into the drawing vector based on the preset vector drawing library, and generates and displays the rendering result of the target component based on the drawing vector. By adopting the above technical solution, in the user-interface-framework based process, performing the layout process on the data set can improve the processing efficiency as to the component, and performing a vector describing process based on the vector drawing library can naturally cross platforms for the realization of the user interface representation and can satisfy more visual effects, and finally, generating the rendering result of the target component based on the drawing vector description ensures the stability of the rendering result and further improves the component presentation effect in the user-interface-framework scene.

In some embodiments, the performing a layout process on the data set to obtain display style information of the target component comprises: processing the data set in accordance with a preset style model to obtain a description of a data structure, and mapping the description of the data structure into a style library function to obtain the display style information of the target component.

The preset style model can be selected and set according to an application scene, and in the embodiment of the present disclosure, the data set can be described using CSS (Cascading Style Sheet). For example, a layout content data set, including layout content such as width, height, padding, margin, and the like, after being described and converted, is mapped into the style library function, to obtain a layout result. The description of the data structure can be understood as a set of function calls for a target layout engine.

It should be noted that, the target component can be updated in an update layout function.

In the above solution, the data set is processed in accordance with the preset style model to obtain the description of the data structure, and the description of the data structure is mapped into the style library function to obtain the display style information of the target component, which avoids reparsing the style of the UI component and recompiling related functions, can quickly see the visual result of the design solution, can more flexibly and efficiently define the style of the user interface component, and makes the user interface component processing efficiency high and stable enough.

In some embodiments, the converting the display style information into a drawing vector based on a preset vector drawing library comprises: performing conversion in the vector drawing library based on the display style information to acquire a drawing style, a drawing path, and a drawing form, and generating the drawing vector based on the drawing style, the drawing path, and the drawing form.

The drawing style decides in what color the target component is presented, which can be in a representation form such as gradual change, padding, and the like; the drawing path is a path described by such a series of commands as: starting a path description, e.g., translating a coordinate to (100, 100), then drawing a line to (100, 200), (200, 200), (200, 100), and ending the path description; and, there are two drawing forms, one being line drawing and the other being padding. The line drawing and padding can both be subject to the description of the drawing path. The description of the drawing path may be a concave polygon or a convex polygon. When geometric partitioning is performed on the concave polygon, there are two methods in computational geometry, namely an even-odd rule and a non-zero winding number rule, and in the embodiment of the present disclosure, triangulation is performed on the concave polygon by using the non-zero winding number rule.

In addition, the attributes which can be seen by the user, such as a color of the target component, whether the target component has a margin, and a width of the margin, jointly decide a style in which the target component is displayed. It can be seen that, regarding the style in which the target component is displayed, if the component has a round corner, the path description can be performed through a Bezier curve; and if the component is a normal square, a rectangle function can be directly used.

It should be noted that, the target component is drawn through the vector drawing library, so that a drawing function, i.e., the drawing vector, can be reloaded to change a drawing result.

Specifically, in the drawing process, drawing in a certain form is performed in a certain style on a certain path in a certain state. That is to say, the description can be performed for the certain state, for example, in what coordinates a target control is drawn, states such as a style, a drawing base point, and the like can be changed through a target application program interface, and the access can be made in a form of a stack.

In the above solution, by using the vector drawing library as a drawing means, the realization of the user interface representation can naturally cross platforms, and can satisfy more visual effects, so that a change in the component presentation effect in design can be more agile, and a product with good visual experience can be better designed.

In some embodiments, the user-interface-framework based processing method can further comprises: acquiring basic attribute information of the target component based on the data set, and performing structure rendering based on the basic attribute information to obtain a component data structure of the target component.

The component data structure refers to that a result of the rendering with respect to the component is a data structure, for example, a program structure corresponding to components such as a button, text, and the like.

In the embodiment of the present disclosure, the data set refers to a plurality of sets of data related to the target component, so that the basic attribute information of the target component is acquired based on the data set, wherein the basic attribute information mainly refers to information such as width, height, padding, background, and the like. Further, structure rendering is performed based on the basic attribute information to obtain the component data structure of the target component, that is to say, the output of component rendering is a maintenance of a tree data structure, that is, the component rendering is the maintenance and update of one tree which has parent and child nodes.

In the above solution, the structure rendering is performed based on the basic attribute information to obtain the component data structure of the target component, so that rapid development and reuse of a plurality of components can be performed, and the component presentation effect in the user-interface-framework scene is further improved.

Optionally, an initial component state of the target component can also be acquired, a target event is acquired based on a target interface, a current component state of the target component is acquired based on the target event, and in a case wherein the initial component state is inconsistent with the current component state, the component data structure is updated.

Specifically, in m states of a set of basic attribute information x1, x2, x3 and so on, an API of n component rendering results such as y1, y2, y3 and so on is generated. If a component rendering result y(i) needs to be transitioned to y(i+1), it is required that two states of x(j) and x(j+1) differ from each other, where m and n are positive integers.

More specifically, a change is generated between the initial component state x1 and the current component state x2 of pressing a button, and therefore, an efficient difference judgment is made for the two states, and a rendering function is re-called for component rendering.

The target interface can be selected and set according to application requirements, and the target event can be, for example, a mouse event, a keyboard event, or the like.

That is to say, one component renderer can be customized, which more efficiently update the component rendering result by providing a capability of requiring component states of a current frame and its previous frame.

It should be noted that, for the processing of the target event, a platform window-level event is, through a node application program interface, transmitted to an open source programming language and then distributed. For example: for a mouse event, function data, after being converted, is passed on just like webpage interface data. That is to say, a platform window is created and a target event is acquired through a corresponding application program interface, and the transmission of the target event is performed through interaction logic, and finally, the target event may change a state of a certain component in a TypeScript library that constructs a user interface, and then change a component rendering result.

In the above solution, by updating the component rendering structure based on the update of the component state, the component processing efficiency and stability are further improved.

In some embodiments, the user-interface-framework based processing method can further comprise: acquiring control logic of the target component based on the data set, receiving a control operation instruction on the rendering result, and responding to the control operation instruction in a case wherein the control operation instruction satisfies the control logic.

In the embodiment of the present disclosure, the control logic of the target component refers to how to implement control over the target component. For example, if the target component is a button, and the control logic is a click, then when a control operation instruction on a button rendering result is received, and the control operation instruction is a click, the control operation instruction is responded.

In the above solution, the control operation for the rendering result of the target component can be implemented, so that the user's use requirement is further satisfied.

In some embodiments, an update request for the target component is acquired, an updated drawing vector is acquired based on the update request, and an updated rendering result of the target component is generated and displayed based on the updated drawing vector.

Specifically, it can be selected to update the rendering result according to different scene requirements. The data set can be re-inputted through the data set input option with respect to the component on the operation interface to send a update request, so that an updated layout result can be acquired based on the update request, and then the updated layout result is converted into an updated drawing vector based on the vector drawing library, and finally an updated rendering result of the target component is generated and displayed based on the updated drawing vector.

In the above solution, the rendering result can be updated in real-time based on the user requirement, so that the requirement of the user for the user interface is further satisfied.

Figure 2:
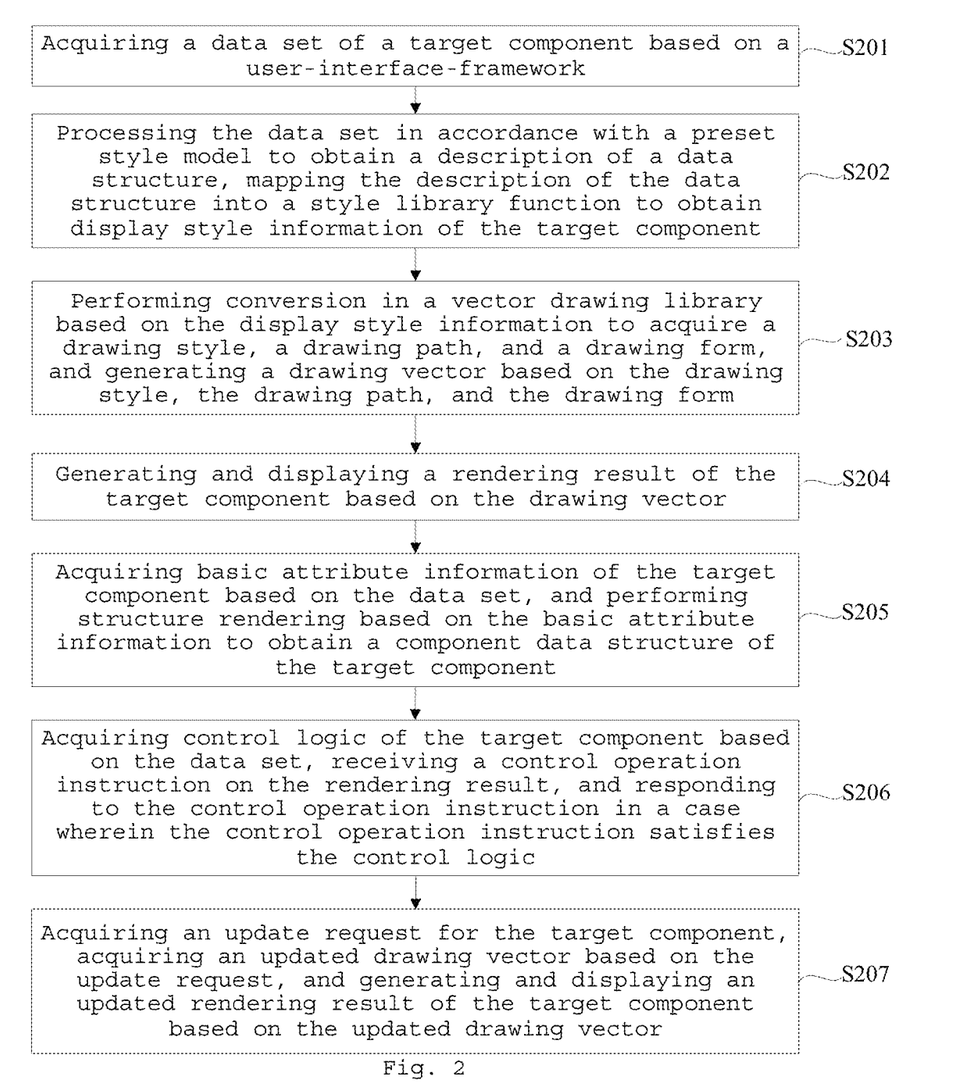
FIG. 2 is a schematic flow diagram of another user-interface-framework based processing method according to an embodiment of the present disclosure.

FIG. 2 is a schematic flow diagram of another user-interface-framework based processing method according to an embodiment of the present disclosure, and on the basis of the above embodiment, this embodiment further optimizes the above user-interface-framework based processing method. As shown in FIG. 2, the method comprises:

step 201, acquiring a data set of a target component based on a user-interface-framework;

step 202, processing the data set according to a preset style model to obtain a description of a data structure, and mapping the description of the data structure into a style library function to obtain display style information of the target component;

step 203, performing conversion in a vector drawing library based on the display style information to acquire a drawing style, a drawing path, and a drawing form, and generating a drawing vector based on the drawing style, the drawing path, and the drawing form;

step 204, generating and displaying a rendering result of the target component based on the drawing vector.

Figure 3:
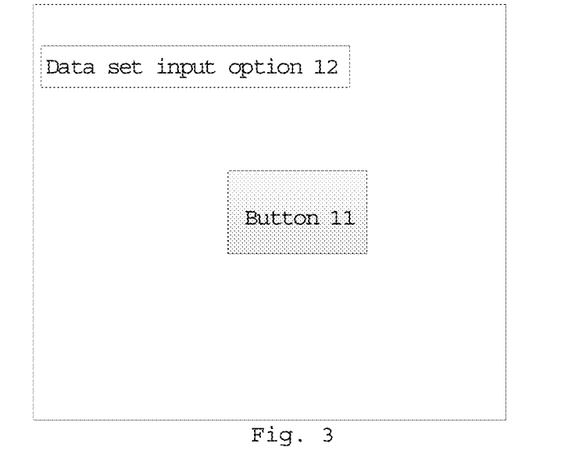
FIG. 3 is a schematic diagram of a rendering result presentation of a target component according to an embodiment of the present disclosure.

Exemplarily, FIG. 3 is a schematic diagram of a rendering result presentation of a target component according to an embodiment of the present disclosure. In FIG. 3, a schematic diagram of one operation page is presented, wherein a button 11 is included as a rendering result, and the button 11 is displayed in a rectangle form.

In the operation page in FIG. 3, a data set input option 12 with respect to the component is also presented. By operating the data set input option 12, the data set of the component can be inputted, such as layout content, a visual description, a current hierarchy, and current logic, etc.

After the step 204, step 205 and/or step 206 and/or step 207 can be executed. An execution order of the steps 205 to 207 can be determined according to a practical situation, and the order shown in FIG. 2 is only an example.

Step 205, acquiring basic attribute information of the target component based on the data set, and performing structure rendering based on the basic attribute information to obtain a component data structure of the target component.

In the embodiment of the present disclosure, an initial component state of the target component is acquired, a target event is acquired based on a target interface, a current component state of the target component is acquired based on the target event, and a component data structure is updated in a case wherein the initial component state is inconsistent with the current component state.

Specifically, the output of component rendering is the maintenance of a tree data structure, and a change in data of a single node can also be understood as the maintenance of a tree which has parent and child nodes, and can also be understood as component rendering update. A parent-child hierarchy relation is decided according to a specific business requirement.

That is to say, a relation between node hierarchies can be understood as a relation between components, such as a relation between a button and text. For example, as shown in FIG. 3, a target event is first positioned to a target node by the rectangle block, and then is subjected to traversal transmission through a path (a path for searching for the target node from a root node) it passed through, to the root node, and then transmitted back to the target node in a reverse order.

The component state can be understood as logic written for business development, and the update of the component structure data can be understood as a transition caused by a data change. For example, one Boolean value is used for representing login, and when a user logs in, a change in a variable occurs so that a component update state is generated, thereby updating the component data structure.

It should be noted that the rendering result of the target component generated based on the drawing vector will be displayed in accordance with the component data structure.

Figure 4:
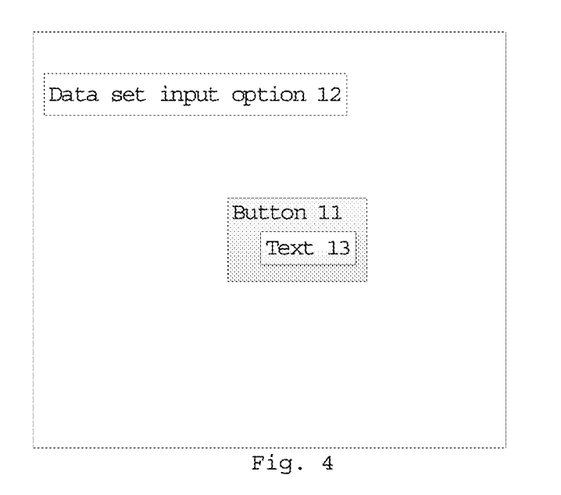
FIG. 4 is a schematic diagram of a rendering result presentation of another target component according to an embodiment of the present disclosure.

Exemplarily, referring to FIG. 4, FIG. 4 is a schematic diagram of a rendering result presentation of another target component according to an embodiment of the present disclosure. In FIG. 4, a schematic diagram of one operation page is presented, wherein a button 11 and text 13 are included as the rendering result. Display is made based on the component data structures of the button 11 and the text 13, and it can be seen that the text 13 is displayed on the button 11.

Step 206, acquiring control logic of the target component based on the data set, receiving a control operation instruction on the rendering result, and responding to the control operation instruction in a case wherein the control operation instruction satisfies the control logic.

In the embodiment of the present disclosure, the control logic of the target component refers to how to implement control over the target component. For example, if the target component is a button, and the control logic is a click, then when a control operation instruction on a button rendering result is received and the control operation instruction is a click, the control operation instruction is responded.

Step 207, acquiring an update request for the target component, acquiring an updated drawing vector based on the update request, and generating and displaying an updated rendering result of the target component based on the updated drawing vector.

Figure 5:
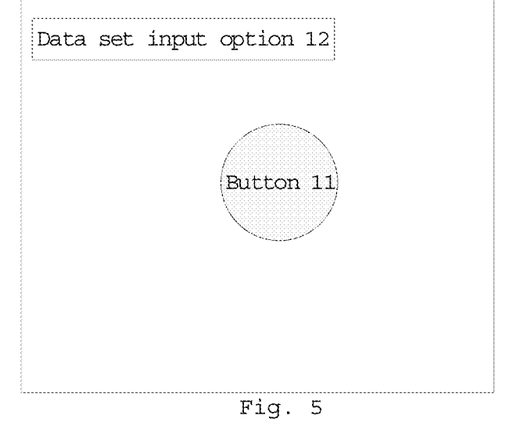
FIG. 5 is a schematic diagram of a rendering result presentation of a further target component according to an embodiment of the present disclosure.

Exemplarily, FIG. 5 is a schematic diagram of a rendering result presentation of a further target component according to an embodiment of the present disclosure. A data set can be re-inputted through a data set input option with respect to a component on an operation interface to send an update request, so that an updated layout result can be acquired based on the update request, and the updated layout result is converted into an updated drawing vector based on a vector drawing library, and finally an updated rendering result of the target component is generated and displayed based on the updated drawing vector. As shown in FIG. 5, the updated rendering result is the button 11, which is displayed in a circular form.

The user-interface-framework based processing solutions according to the embodiment of the present disclosure acquire a data set of a target component based on a user-interface-framework; process the data set in accordance with a preset style model to obtain a description of a data structure, map the description of the data structure into a style library function to obtain display style information of the target component; perform conversion in a vector drawing library based on the display style information to acquire a drawing style, a drawing path, and a drawing form, generate a drawing vector based on the drawing style, the drawing path, and the drawing form; generate and display a rendering result of the target component based on the drawing vector; acquire basic attribute information of the target component based on the data set, and perform structure rendering based on the basic attribute information to obtain a component data structure of the target component; acquire control logic of the target component based on the data set, receive a control operation instruction on the rendering result, and respond to the control operation instruction in a case wherein the control operation instruction satisfies the control logic; and, acquire an update request for the target component, acquire an updated drawing vector based on the update request, and generate and display an updated rendering result of the target component based on the updated drawing vector. By adopting the above technical solutions, the efficiency as to the user interface is high and stable enough, so that rapid trial-and-error development can be performed, it is friendly enough to both a development editor and a development plugin, it can be more agile for a change in the component display effect in design, a product with good visual experience can be better designed, and existing code can be used as much as possible, and hence for a requirement for extension, a good support can be provided. There are mature user interface and business development logic, and a logic service can be separated to facilitate compiling. That is to say, the TypeScript library for constructing the user interface is directly used as the solution at the visual level, so that it is very friendly to compile logic, and the vector drawing library is used as the drawing means so that the realization of the user interface representation can naturally cross platforms, and more visual effects can be satisfied. It is more friendly to the user, and a modern language is used. Regarding the editor, the application program interfaces are developed outward. The use of a language with good ecology will be attractive. And finally, rapid development and reuse of many components can also be performed.

Figure 6:
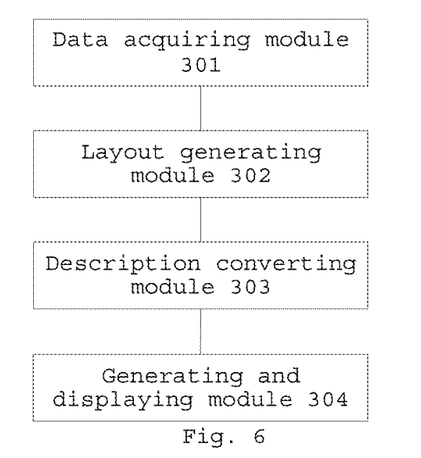
FIG. 6 is a schematic structural diagram of a user-interface-framework based processing apparatus according to an embodiment of the present disclosure.

FIG. 6 is a schematic structural diagram of a user-interface-framework based processing apparatus according to an embodiment of the present disclosure, wherein the apparatus can be implemented by software and/or hardware, and can be generally integrated in an electronic device. As shown in FIG. 6, the apparatus comprises:

a data acquiring module 301 configured to acquire a data set of a target component based on a user-interface-framework;

a layout generating module 302 configured to perform a layout process on the data set to obtain display style information of the target component;

a description converting module 303 configured to convert the display style information into a drawing vector based on a preset vector drawing library; and a generating and displaying module 304 configured to generate and display a rendering result of the target component based on the drawing vector.

Optionally, the layout generating module 302 is specifically configured to:

process the data set in accordance with a preset style model to obtain a description of a data structure; and map the description of the data structure into a style library function to obtain the display style information of the target component.

Optionally, the description converting module 303 is specifically configured to:

perform conversion in the vector drawing library based on the display style information to acquire a drawing style, a drawing path, and a drawing form; and generate the drawing vector based on the drawing style, the drawing path, and the drawing form.

Optionally, the apparatus further comprises:

an information acquiring module configured to acquire basic attribute information of the target component based on the data set; and a rendering generation module configured to perform structure rendering based on the basic attribute information to obtain a component data structure of the target component.

Optionally, the apparatus further comprises:

a first state-acquiring module configured to acquire an initial component state of the target component;

an event-acquiring module configured to acquire a target event based on a target interface;

a second state-acquiring module configured to acquire a current component state of the target component based on the target event; and an component structure updating module configured to update the component data structure in a case wherein the initial component state is inconsistent with the current component state.

Optionally, the apparatus further comprises:

a control logic acquiring module configured to acquire control logic of the target component based on the data set;

an instruction reception module configured to receive a control operation instruction on the rendering result; and a response module configured to respond to the control operation instruction in a case wherein the control operation instruction satisfies the control logic.

Optionally, the apparatus further comprises:

a request acquiring module configured to acquire an update request for the target component;

an updated description acquiring module configured to acquire an updated drawing vector based on the update request; and an update and display module configured to generate and display an updated rendering result of the target component based on the updated drawing vector.

The user-interface-framework based processing apparatus according to the embodiment of the present disclosure can execute the user-interface-framework based processing method according to any embodiment of the present disclosure, and has corresponding function modules for executing the method and beneficial effects.

An embodiment of the present disclosure also provides a computer program product comprising a computer program/instructions which, when executed by a processor, implements the user-interface-framework based processing method according to any embodiment of the present disclosure.

Figure 7:
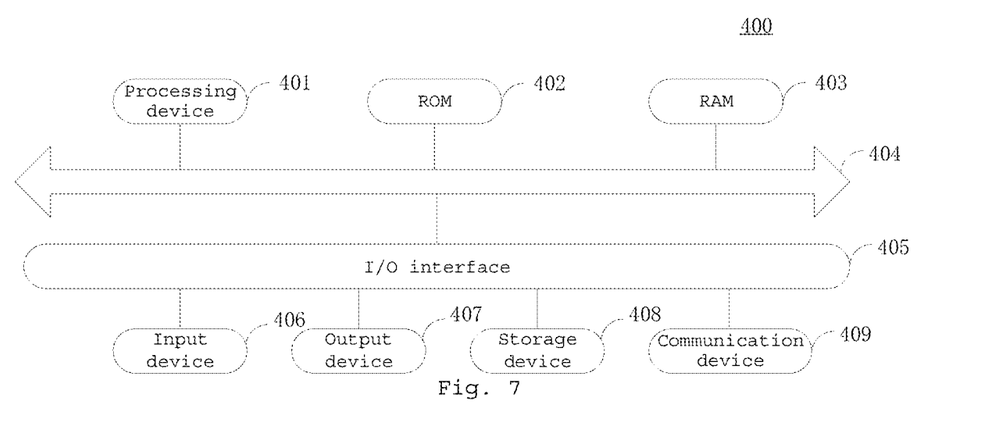
FIG. 7 is a schematic structural diagram of an electronic device according to an embodiment of the present disclosure.

FIG. 7 is a schematic structural diagram of an electronic device according to an embodiment of the present disclosure. Referring now specifically to FIG. 7, FIG. 7 illustrates a schematic block diagram of an electronic device 400 suitable for implementing the embodiment of the present disclosure. The electronic device 400 in the embodiment of the present disclosure can include, but is not limited to, a mobile terminal such as a mobile phone, notebook computer, digital broadcast receiver, PDA (Personal Digital Assistant), PAD (tablet computer), PMP (Portable Multimedia Player), vehicle-mounted terminal (e.g., vehicle-mounted navigation terminal), and the like, and a fixed terminal such as a digital TV, desktop computer, and the like. The electronic device shown in FIG. 7 is only an example, and should not bring any limitation to the function and the use scope of the embodiment of the present disclosure.

As shown in FIG. 7, the electronic device 400 can comprise a processing device (e.g., central processing unit, graphics processor, etc.) 401, which can execute various suitable actions and processes according to a program stored in a read-only memory (ROM) 402 or a program loaded from a storage device 408 into a random access memory (RAM) 403. In the RAM 403, various programs and data necessary for the operation of the electronic device 400 are also stored. The processing device 401, the ROM 402, and the RAM 403 are connected to each other through a bus 404. An input/output (I/O) interface 405 is also connected to the bus 404.

Generally, the following devices can be connected to the I/O interface 405: an input device 406 including, for example, a touch screen, touch pad, keyboard, mouse, camera, microphone, accelerometer, gyroscope, etc.; an output device 407 including, for example, a liquid crystal display (LCD), speaker, vibrator, etc.; a storage device 408 including, for example, a magnetic tape, hard disk, etc.; and a communication device 409. The communication device 409 can allow the electronic device 400 to perform wireless or wired communication with another device to exchange data. While FIG. 7 illustrates the electronic device 400 with various devices, it should be understood that all illustrated devices are not required to be implemented or provided. More or fewer devices can be alternatively implemented or provided.

In particular, according to the embodiment of the present disclosure, the process described above with reference to the flow diagrams can be implemented as a computer software program. For example, an embodiment of the present disclosure comprises a computer program product comprising a computer program carried on a non-transitory computer-readable medium, the computer program containing program code for performing the method illustrated by the flow diagrams. In such an embodiment, the computer program can be downloaded and installed from a network via the communication device 409, or installed from the storage device 408, or installed from the ROM 402. When executed by the processing device 401, the computer program performs the above functions defined in the user-interface-framework based processing method of the embodiment of the present disclosure.

It should be noted that the above computer-readable medium of the present disclosure can be a computer-readable signal medium or a computer-readable storage medium or any combination of the two. The computer-readable storage medium can be, for example, but not limited to, an electronic, magnetic, optical, electromagnetic, infrared, or semiconductor system, apparatus, or device, or any combination of the above. More specific examples of the computer-readable storage medium can include, but are not limited to: an electrical connection having one or more wires, portable computer diskette, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the above. In the present disclosure, the computer-readable storage medium can be any tangible medium containing or storing a program, wherein the program can be used by or in conjunction with an instruction execution system, apparatus, or device. However, in the present disclosure, the computer-readable signal medium can include a data signal propagated in baseband or as part of a carrier wave, in which computer-readable program code is carried. Such a propagated data signal can take a variety of forms, including but not limited to an electro-magnetic signal, optical signal, or any suitable combination of the above. The computer-readable signal medium can be any computer-readable medium other than the computer-readable storage medium, and the computer-readable signal medium can send, propagate, or transmit a program for use by or in conjunction with an instruction execution system, apparatus, or device. Program code contained on the computer-readable medium can be transmitted using any suitable medium, including but not limited to: an electrical wire, optical cable, RF (radio frequency), etc., or any suitable combination of the above.

In some implementations, a client and a server can communicate using any currently known or future developed network protocol, such as HTTP (Hyper Text Transfer Protocol), and can be interconnected with any form or medium of digital data communication (e.g., a communication network). Examples of the communication network include a local area network ("LAN"), a wide area network ("WAN"), an internet (e.g., the Internet), and a peer-to-peer network (e.g., ad hoc peer-to-peer network), as well as any currently known or future developed network.

The computer-readable medium can be contained in the above electronic device; or can exist alone and not be assembled into the electronic device.

The above computer-readable medium has thereon carried one or more programs which, when executed by the electronic device, cause the electronic device to: receive an information presentation trigger operation of a user in a playing process of a video; acquiring at least two pieces of target information associated with the video; presenting first target information in the at least two pieces of target information in an information presentation area of a playing page of the video, wherein a size of the information presentation area is smaller than that of the playing page; and receiving a first switching trigger operation of the user to switch the first target information presented in the information presentation area into second target information in the at least two pieces of target information.

Computer program code for performing operations of the present disclosure can be written in one or more programming languages or a combination thereof, wherein the programming language includes, but is not limited to, an object-oriented programming language such as Java, Smalltalk, C++, and also includes a conventional procedural programming language such as a "C" language or similar programming language. The program code can be executed entirely on a user computer, partly on the user computer, as a stand-alone software package, partly on the user computer and partly on a remote computer or entirely on the remote computer or server. In a scene where the remote computer is involved, the remote computer can be connected to the user computer through any type of network, including a local area network (LAN) or a wide area network (WAN), or can be connected to an external computer (for example, through the Internet using an Internet service provider).

The flow diagrams and block diagrams in the accompanying drawings illustrate the possibly implemented architecture, functions, and operations of the system, method and computer program product according to various embodiments of the present disclosure. In this regard, each block in the flow diagrams or block diagrams can represent one module, program segment, or portion of code, which contains one or more executable instructions for implementing the specified logic function. It should also be noted that, in some alternative implementations, functions noted in blocks can occur in an order different from an order noted in the drawings. For example, two blocks shown in succession can, in fact, be executed substantially concurrently, and they can sometimes be executed in a reverse order, which depends upon functions involved. It will also be noted that each block in the block diagrams and/or flow diagrams, and a combination of blocks in the block diagrams and/or flow diagrams, can be implemented by a dedicated hardware-based system that performs a specified function or operation, or a combination of dedicated hardware and computer instructions.

The involved unit described in the embodiment of the present disclosure can be implemented by software or hardware. The name of the unit does not, in some cases, constitute a limitation on the unit itself.

The functions described herein above can be performed, at least in part, by one or more hardware logic components. For example, without limitation, an exemplary type of hardware logic component that can be used includes: a field programmable gate array (FPGA), application specific integrated circuit (ASIC), application specific standard product (ASSP), system on a chip (SOC), complex programmable logic device (CPLD), and the like. In the context of this disclosure, a machine-readable medium can be a tangible medium, which can contain or store a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium would include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

According to one or more embodiments of the present disclosure, there is provided a user-interface-framework based processing method, comprising:
  acquiring a data set of a target component based on a user-interface-framework;
  performing a layout process on the data set to obtain display style information of the target component;
  converting the display style information into a drawing vector based on a preset vector drawing library; and
  generating and displaying a rendering result of the target component based on the drawing vector.

According to one or more embodiments of the present disclosure, in the user-interface-framework based processing method provided by the present disclosure, the performing a layout process on the data set to obtain display style information of the target component comprises:
  processing the data set in accordance with a preset style model to obtain a description of a data structure; and
  mapping the description of the data structure into a style library function to obtain the display style information of the target component.

According to one or more embodiments of the present disclosure, in the user-interface-framework based processing method provided by the present disclosure, the converting the display style information into a drawing vector based on a preset vector drawing library comprises:

performing conversion in the vector drawing library based on the display style information to acquire a drawing style, a drawing path, and a drawing form; and generating the drawing vector based on the drawing style, the drawing path, and the drawing form.

According to one or more embodiments of the present disclosure, the user-interface-framework based processing method further comprises:

acquiring basic attribute information of the target component based on the data set; and performing structure rendering based on the basic attribute information to obtain a component data structure of the target component.

According to one or more embodiments of the present disclosure, the user-interface-framework based processing method further comprises:

acquiring an initial component state of the target component;

acquiring a target event based on a target interface;

acquiring a current component state of the target component based on the target event; and updating the component data structure in a case wherein the initial component state is inconsistent with the current component state.

According to one or more embodiments of the present disclosure, the user-interface-framework based processing method further comprises:

acquiring control logic of the target component based on the data set;

receiving a control operation instruction on the rendering result; and responding to the control operation instruction in a case wherein the control operation instruction satisfies the control logic.

According to one or more embodiments of the present disclosure, the user-interface-framework based processing method further comprises:

acquiring an update request for the target component;

acquiring an updated drawing vector based on the update request; and generating and displaying an updated rendering result of the target component based on the updated drawing vector.

According to one or more embodiments of the present disclosure, there is provided a user-interface-framework based processing apparatus, comprising:

a data acquiring module configured to acquire a data set of a target component based on a user-interface-framework;

a layout generating module configured to perform a layout process on the data set to obtain display style information of the target component;

a description converting module configured to convert the display style information into a drawing vector based on a preset vector drawing library; and a generating and displaying module configured to generate and display a rendering result of the target component based on the drawing vector.

According to one or more embodiments of the present disclosure, in the user-interface-framework based processing apparatus provided by the present disclosure, the layout generating module is specifically configured to:

process the data set in accordance with a preset style model to obtain a description of a data structure; and map the description of the data structure into a style library function to obtain the display style information of the target component.

According to one or more embodiments of the present disclosure, in the user-interface-framework based processing apparatus provided by the present disclosure, the description converting module is specifically configured to:

perform conversion in the vector drawing library based on the display style information to acquire a drawing style, a drawing path, and a drawing form; and generate the drawing vector based on the drawing style, the drawing path, and the drawing form.

According to one or more embodiments of the present disclosure, in the user-interface-framework based processing apparatus provided by the present disclosure, the apparatus further comprises:

an information acquiring module configured to acquire basic attribute information of the target component based on the data set; and a rendering generation module configured to perform structure rendering based on the basic attribute information to obtain a component data structure of the target component.

According to one or more embodiments of the present disclosure, in the user-interface-framework based processing apparatus provided by the present disclosure, the apparatus further comprises:

a first state-acquiring module configured to acquire an initial component state of the target component;

an event-acquiring module configured to acquire a target event based on a target interface;

a second state-acquiring module configured to acquire a current component state of the target component based on the target event; and an component structure updating module configured to update the component data structure in a case wherein the initial component state is inconsistent with the current component state.

According to one or more embodiments of the present disclosure, in the user-interface-framework based processing apparatus provided by the present disclosure, the apparatus further comprises:

a control logic acquiring module configured to acquire control logic of the target component based on the data set;

an instruction reception module configured to receive a control operation instruction on the rendering result; and a response module configured to respond to the control operation instruction in a case wherein the control operation instruction satisfies the control logic.

According to one or more embodiments of the present disclosure, in the user-interface-framework based processing apparatus provided by the present disclosure, the apparatus further comprises:

a request acquiring module configured to acquire an update request for the target component;

an updated description acquiring module configured to acquire an updated drawing vector based on the update request; and an update and display module configured to generate and display an updated rendering result of the target component based on the updated drawing vector.

According to one or more embodiments of the present disclosure, there is provided an electronic device, comprising:

a processor; and a memory for storing instructions executable by the processor;

the processor being configured to read the executable instructions from the memory and execute the instructions to implement any of the user-interface-framework based processing methods according to the present disclosure.

According to one or more embodiments of the present disclosure, there is provided a computer-readable storage medium stored thereon a computer program for performing any of the user-interface-framework based processing methods according to the present disclosure.

The above description is only an explanation of the preferred embodiments of the present disclosure and the applied technical principles. It should be appreciated by those skilled in the art that the disclosure scope involved in the present disclosure is not limited to the technical solutions formed by specific combinations of the above technical features, but also encompasses other technical solutions formed by an arbitrary combination of the above technical features or their equivalent features without departing from the above disclosure concept. The other technical solutions are, for example, technical solutions formed by replacing the above features with technical features having functions similar to those disclosed (but not limited to) in the present disclosure.

Furthermore, while various operations are depicted in a specific order, this should not be understood as requiring that such operations be performed in the specific order shown or in a sequential order. Under certain circumstances, multi-tasking and parallel processing may be advantageous. Similarly, while several specific implementation details are included in the above discussion, these should not be construed as limitations on the scope of the present disclosure. Some features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to a structural feature and/or method logic action, it should be understood that the subject matter defined in the attached claims is not necessarily limited to the specific feature or action described above. Conversely, the specific feature and action described above are only exemplary forms for implementing the claims.

What is claimed is:

1. A method for designing a user-interface-framework, comprising:
acquiring a data set of a target component;
processing the data set in accordance with cascading style sheet (CSS) to obtain a description of a data structure, and mapping the description of the data structure into a style library function to obtain the display style information of the target component;
based on a preset vector drawing library, converting the display style information to acquire a drawing style, a drawing path, and a drawing form, and generating a drawing vector based on the drawing style, the drawing path, and the drawing form; and
generating and displaying a rendering result of the target component based on the drawing vector.

2. The method according to claim 1, further comprising:
acquiring basic attribute information of the target component based on the data set; and
performing structure rendering based on the basic attribute information to obtain a component data structure of the target component,
wherein the generating and displaying a rendering result of the target component based on the drawing vector comprises displaying the rendering result of the target component in accordance with the component data structure of the target component.

3. The method according to claim 2, further comprising:
acquiring an initial component state of the target component;
acquiring a target event based on a target interface;
acquiring a current component state of the target component based on the target event; and
updating the component data structure in response to the initial component state being inconsistent with the current component state.

4. The method according to claim 2, wherein the component data structure of the target component comprises a tree-shaped data structure.

5. The method according to claim 1, further comprising:
acquiring control logic of the target component based on the data set;
receiving a control operation instruction on the rendering result; and
responding to the control operation instruction in response to the control operation instruction satisfying the control logic.

6. The method according to claim 1, further comprising:
acquiring an update request for the target component;
acquiring an updated drawing vector based on the update request; and
generating and displaying an updated rendering result of the target component based on the updated drawing vector.

7. An electronic device, comprising:
a processor; and
a memory for storing instructions executable by the processor;
the processor being configured to read the executable instructions from the memory and execute the instructions to implement following operations for designing a user-interface-framework:
acquiring a data set of a target component;
processing the data set in accordance with cascading style sheet (CSS) to obtain a description of a data structure, and mapping the description of the data structure into a style library function to obtain the display style information of the target component;
based on a preset vector drawing library, converting the display style information to acquire a drawing style, a drawing path, and a drawing form, and generating a drawing vector based on the drawing style, the drawing path, and the drawing form; and
generating and displaying a rendering result of the target component based on the drawing vector.

8. The electronic device according to claim 7, wherein the processor is configured to read the executable instructions from the memory and execute the instructions to further implement following operations:
acquiring basic attribute information of the target component based on the data set; and
performing structure rendering based on the basic attribute information to obtain a component data structure of the target component,
wherein the generating and displaying a rendering result of the target component based on the drawing vector comprises displaying the rendering result of the target component in accordance with the component data structure of the target component.

9. The electronic device according to claim 8, wherein the processor is configured to read the executable instructions from the memory and execute the instructions to further implement following operations:
- acquiring an initial component state of the target component;
- acquiring a target event based on a target interface;
- acquiring a current component state of the target component based on the target event; and
- updating the component data structure in response to the initial component state being inconsistent with the current component state.

10. The electronic device according to claim 8, wherein the component data structure of the target component comprises a tree-shaped data structure.

11. The electronic device according to claim 7, wherein the processor is configured to read the executable instructions from the memory and execute the instructions to further implement following operations:
- acquiring control logic of the target component based on the data set;
- receiving a control operation instruction on the rendering result; and
- responding to the control operation instruction in response to the control operation instruction satisfying the control logic.

12. The electronic device according to claim 7, wherein the processor is configured to read the executable instructions from the memory and execute the instructions to further implement following operations:
- acquiring an update request for the target component;
- acquiring an updated drawing vector based on the update request; and
- generating and displaying an updated rendering result of the target component based on the updated drawing vector.

13. A non-transitory computer-readable storage medium storing thereon a computer program which, when executed by a computer, causes the computer to perform following operations for designing a user-interface-framework;
- acquiring a data set of a target component;
- processing the data set in accordance with cascading style sheet (CSS) to obtain a description of a data structure, and mapping the description of the data structure into a style library function to obtain the display style information of the target component;
- based on a preset vector drawing library, converting the display style information to acquire a drawing style, a drawing path, and a drawing form, and generating a drawing vector based on the drawing style, the drawing path, and the drawing form; and
- generating and displaying a rendering result of the target component based on the drawing vector.

14. The non-transitory computer-readable storage medium according to claim 13, wherein the computer program, when executed by the computer, causes the computer to further perform following operations:
- acquiring basic attribute information of the target component based on the data set; and
- performing structure rendering based on the basic attribute information to obtain a component data structure of the target component,
- wherein the generating and displaying a rendering result of the target component based on the drawing vector comprises displaying the rendering result of the target component in accordance with the component data structure of the target component.

15. The non-transitory computer-readable storage medium according to claim 14, wherein the computer program, when executed by the computer, causes the computer to further perform following operations:
- acquiring an initial component state of the target component;
- acquiring a target event based on a target interface;
- acquiring a current component state of the target component based on the target event; and
- updating the component data structure in response to the initial component state being inconsistent with the current component state.

16. The non-transitory computer-readable storage medium according to claim 14, wherein the component data structure of the target component comprises a tree-shaped data structure.

17. The non-transitory computer-readable storage medium according to claim 13, wherein the computer program, when executed by the computer, causes the computer to further perform following operations:
- acquiring control logic of the target component based on the data set;
- receiving a control operation instruction on the rendering result; and
- responding to the control operation instruction in response to the control operation instruction satisfying the control logic.

18. The non-transitory computer-readable storage medium according to claim 13, wherein the computer program, when executed by the computer, causes the computer to further perform following operations:
- acquiring an update request for the target component;
- acquiring an updated drawing vector based on the update request; and
- generating and displaying an updated rendering result of the target component based on the updated drawing vector.

* * * * *